US011259002B2

(12) United States Patent
Le Dortz et al.

(10) Patent No.: US 11,259,002 B2
(45) Date of Patent: Feb. 22, 2022

(54) TIME-OF-FLIGHT CAMERA AND PROXIMITY DETECTOR

(71) Applicant: Analog Devices International Unlimited Company, Limerick (IE)

(72) Inventors: Nicolas Le Dortz, Cambridge, MA (US); Jonathan Ephraim David Hurwitz, Edinburgh (GB); Erik D. Barnes, Cambridge, MA (US)

(73) Assignee: ANALOG DEVICES INTERNATIONAL UNLIMITED COMPANY, Limerick (IE)

( * ) Notice: Subject to any disclaimer, the term of this patent is extended or adjusted under 35 U.S.C. 154(b) by 0 days.

(21) Appl. No.: 16/742,901

(22) Filed: Jan. 14, 2020

(65) Prior Publication Data
US 2020/0264311 A1 Aug. 20, 2020

Related U.S. Application Data

(60) Provisional application No. 62/806,595, filed on Feb. 15, 2019, provisional application No. 62/806,561, filed on Feb. 15, 2019, provisional application No. 62/806,722, filed on Feb. 15, 2019.

(51) Int. Cl.
| H04N 13/128 | (2018.01) |
| G01S 17/10 | (2020.01) |
| H04N 5/225 | (2006.01) |
| H04N 13/254 | (2018.01) |
| G01S 7/4863 | (2020.01) |
| G01S 17/894 | (2020.01) |
| G01S 17/32 | (2020.01) |
| H04N 5/232 | (2006.01) |
| G01S 7/4915 | (2020.01) |
| H04N 13/00 | (2018.01) |

(52) U.S. Cl.
CPC ......... *H04N 13/128* (2018.05); *G01S 7/4863* (2013.01); *G01S 7/4915* (2013.01); *G01S 17/10* (2013.01); *G01S 17/32* (2013.01); *G01S 17/894* (2020.01); *H04N 5/2256* (2013.01); *H04N 5/23245* (2013.01); *H04N 13/254* (2018.05); *H04N 2013/0081* (2013.01)

(58) Field of Classification Search
None
See application file for complete search history.

(56) References Cited

U.S. PATENT DOCUMENTS

| 10,328,900 | B1 | 6/2019 | Yakovenko et al. |
| 10,451,741 | B2 | 10/2019 | Xu |
| 2006/0209631 | A1 | 9/2006 | Melese et al. |
| 2012/0013887 | A1 | 1/2012 | Xu et al. |
| 2013/0144137 | A1 | 6/2013 | Zalevsky et al. |

(Continued)

FOREIGN PATENT DOCUMENTS

EP      3460509      10/2017

*Primary Examiner* — Talha M Nawaz
(74) *Attorney, Agent, or Firm* — Patent Capital Group

(57) ABSTRACT

Time of Flight (ToF) image processing systems and methods for proximity detection are disclosed. In particular, use of a separate proximity detector can be eliminated by using the time of flight image processing system as disclosed herein. In particular, the time of flight image processing system has two modes: a low resolution proximity detection mode and a high resolution imaging mode.

20 Claims, 15 Drawing Sheets

(56) References Cited

U.S. PATENT DOCUMENTS

| | | | |
|---|---|---|---|
| 2014/0002636 A1* | 1/2014 | Lee | G01C 3/08 |
| | | | 348/135 |
| 2015/0304534 A1 | 10/2015 | Kadambi et al. | |
| 2015/0355311 A1 | 12/2015 | O'Hagan et al. | |
| 2016/0055400 A1* | 2/2016 | Jorquera | G06T 7/20 |
| | | | 416/1 |
| 2016/0071275 A1 | 3/2016 | Hirovnen | |
| 2016/0086318 A1 | 3/2016 | Hannuksela et al. | |
| 2016/0119611 A1 | 4/2016 | Hall et al. | |
| 2016/0161611 A1 | 6/2016 | Ito et al. | |
| 2016/0223656 A1* | 8/2016 | Hall | G01S 17/18 |
| 2017/0205497 A1 | 7/2017 | Dorrington et al. | |
| 2018/0067197 A1 | 3/2018 | Schockaert et al. | |
| 2019/0018119 A1 | 1/2019 | Laifenfeld et al. | |
| 2019/0046302 A1 | 2/2019 | Li et al. | |
| 2019/0109977 A1* | 4/2019 | Dutton | H04N 5/3454 |
| 2019/0113605 A1* | 4/2019 | Liobe | H04N 5/3745 |
| 2019/0386744 A1 | 12/2019 | Plank et al. | |
| 2020/0021792 A1 | 1/2020 | Amaya-Benitez et al. | |
| 2020/0066779 A1* | 2/2020 | Dutton | H01L 31/02027 |
| 2020/0125822 A1* | 4/2020 | Yang | G06N 3/08 |
| 2020/0249348 A1 | 8/2020 | Mathy | |
| 2020/0267367 A1 | 8/2020 | Le Dortz et al. | |

* cited by examiner

TIME-OF-FLIGHT CAMERA AND PROXIMITY DETECTOR

RELATED APPLICATIONS

This application claims priority to U.S. Patent Application Ser. No. 62/806,595 filed Feb. 15, 2019 entitled "Time-of-Flight Camera and Proximity Detector", U.S. Patent Application Ser. No. 62/806,561 filed Feb. 15, 2019 entitled "Spatial Correlation Sampling in Time-of-Flight Imaging", and U.S. Patent Application Ser. No. 62/806,722 filed Feb. 15, 2019 entitled "Depth Non-Linearity Compensation in Time-of-Flight Imaging", which are hereby incorporated by reference in their entirety. Additionally, this application is related to U.S. Patent Application entitled "Spatial Correlation Sampling in Time-of-Flight Imaging" filed Jan. 14, 2020, and U.S. Patent Application entitled "Depth Non-Linearity Compensation in Time-of-Flight Imaging" filed Jan. 14, 2020, which are hereby incorporated by reference in their entirety.

FIELD OF THE DISCLOSURE

The present disclosure pertains to time of flight (ToF) imaging. More specifically, this disclosure describes systems and techniques relating to continuous wave ToF imaging.

BACKGROUND

Time of flight (ToF) is a property of an object, particle or acoustic, electromagnetic, or other wave. It is the time that such an object needs to travel a distance through a medium. The measurement of this time (i.e. the time of flight) can be used for a time standard (such as an atomic fountain), as a way to measure velocity or path length through a given medium, or as a way to learn about the particle or medium (such as composition or flow rate). The traveling object may be detected directly (e.g., ion detector in mass spectrometry) or indirectly (e.g., light scattered from an object in laser doppler velocimetry).

The Time-of-Flight principle (ToF) is a method for measuring the distance between a sensor and an object based on the time difference between the emission of a signal and its return to the sensor after being reflected by an object. Various types of signals (also called carriers) can be used with ToF, the most common being sound and light. Some sensors use light as their carrier because it is uniquely able to combine speed, range, low weight and eye-safety. Infrared light can ensure less signal disturbance and easier distinction from natural ambient light resulting in the higher performing sensors for a given size and weight.

A time-of-flight camera (ToF camera) is a range imaging camera system that resolves distance based on the known speed of light, measuring the time-of-flight of a light signal between the camera and the subject for each point of the image.

In time-of-flight (TOF) cameras, the image sensor captures a two-dimensional image, or several two-dimensional images, from which a processor can determine the distance to objects in the scene. The TOF camera is further equipped with a light source that illuminates objects whose distances from the device are to be measured by detecting the time it takes the emitted light to return to the image sensor. The system may also utilize image processing techniques.

A depth camera is a camera where each pixel outputs the distance between the camera and the scene. One technique to measure depth is to calculate the time it takes for the light to travel from a light source on the camera to a reflective surface and back to the camera. This travel time is commonly referred as time of flight.

Many devices include multiple cameras and detectors each having a different purpose or use. Having multiple cameras and detectors, in addition to speakers and microphones, consumes space and apertures on the interior and exterior of the phone

SUMMARY OF THE DISCLOSURE

Systems and methods for Time of Flight (ToF) depth image processing for proximity detection are disclosed. In particular, a time of flight image processing system as disclosed herein can be used for proximity detection, thereby eliminating the use of a separate proximity detector. In particular, the time of flight image processing system has two modes: a low resolution proximity detection mode and a high resolution imaging mode.

According to one implementation, a time of flight image processing system has two modes and includes a light source, an image sensor, and a processor. The light source is configured to emit light during a first time interval. The image sensor includes a plurality of pixels, and, in a first mode, a subset of the plurality of pixels is turned on. The processor receives a readout from the image sensor, and in the first mode, the processor makes a proximity detection determination. In one example, the first mode is a low resolution mode.

According to one aspect, a method for proximity detection using a time-of-flight depth imaging system includes entering a first imaging system mode and, in the first imaging system mode: receiving reflected light at a sensor array having a plurality of pixels, activating a first subset of the plurality of pixels, deactivating a second subset of the plurality of pixels, and generating a proximity determination based on data from the first subset of the plurality of pixels; and entering a second imaging system mode and, in the second imaging system mode: emitting light from a light source during a first time interval, activating the second subset of the plurality of pixels, and receiving reflected emitted light at the sensor array.

According to some implementations, the method further includes, in the second imaging system mode, generating a high resolution depth image. In some implementations, the first mode is a low resolution mode. In some implementations, activating the first subset of the plurality of pixels includes collecting reflected light at the first subset of the plurality of pixels.

According to some implementations, the method further includes, when the reflected light collected at the first subset of the plurality of pixels is below a selected threshold, determining a distance to an object. In some implementations, generating the proximity determination includes generating the proximity determination based, at least in part, on the distance. According to some implementations, the method further includes comparing the reflected light collected at the first subset of the plurality of pixels to emitted light, and determining a distance to an object.

According to some implementations, the method further includes, collecting a plurality of spatial correlation samples from the first subset of the plurality of pixels, and determining a phase based on at least a subset of the plurality of spatial correlation samples.

According to one aspect, a time of flight image processing system has two modes, and includes a light source configured to emit light during a first time interval, a sensor array comprising a plurality of pixels for receiving reflected light, wherein, in a first mode, a first subset of the plurality of pixels are activated and a second subset of the plurality of pixels are deactivated, and a processor configured to receive a readout from the sensor array, wherein, in the first mode, the processor generates a proximity determination.

In some implementations, the first mode is a low resolution mode. In some implementations, the first subset of the plurality of pixels includes less than about a quarter of the plurality of pixels. In some implementations, the first subset of the plurality of pixels includes adjacent pixels. In some implementations, the first subset of the plurality of pixels includes non-adjacent pixels. In some implementations, in a second mode, the plurality of pixels including the second subset of the plurality of pixels are activated, and the processor generates a high resolution depth image. In some implementations, during the first time interval, the time of flight image processing system is in the second mode. In some implementations, when the first subset of pixels is activated, the first subset of pixels is configured to collect reflected light. In some implementations, when the reflected light collected at the first subset of pixels is below a selected threshold, the processor is configured to determine a distance to an object, and wherein the processor generates the proximity determination based, at least in part, on the distance. In some implementations, the processor is configured to compare the reflected light collected at the first subset of the plurality of pixels to emitted light, and determine a distance to an object.

According to one aspect, a system for proximity detection using a time-of-flight depth imager, includes a light source configured to emit light, a sensor array comprising a plurality of pixels for receiving reflected light, including a first subset of pixels and a second subset of pixels, and a processor configured to receive a readout from the sensor array. In a first imaging system mode, the first subset of pixels is activated, the second subset of pixels is deactivated, and the processor makes a proximity detection determination. In a second imaging system mode, the first and second subsets of pixels are activated, the light sources emits light, and the processor generates a high resolution depth image.

In some implementations, the first imaging mode is a low resolution mode. In some implementations, when the first subset of pixels is activated, the first subset of pixels is configured to collect reflected light. In some implementations, when the reflected light collected at the first subset of pixels is below a selected threshold, the processor is configured to determine a distance to an object, and wherein the processor generates the proximity determination based, at least in part, on the distance. In some implementations, the processor is configured to compare the collected reflected light to the emitted light to determine a distance to an object, and wherein the processor generates the proximity determination based, at least in part, on the distance.

The drawings show exemplary ToF circuits, systems and configurations. Variations of these systems, for example, changing the positions of, adding, or removing certain elements from the circuits are not beyond the scope of the present invention. The illustrated ToF devices and configurations are intended to be complementary to the support found in the detailed description.

This overview is intended to provide an overview of subject matter of the present patent application. Further limitations and disadvantages of conventional and traditional approaches will become apparent to one of skill in the art, through comparison of such systems with some aspects of the present invention as set forth in the remainder of the present application with reference to the drawings.

BRIEF DESCRIPTION OF THE DRAWINGS

For a fuller understanding of the nature and advantages of the present invention, reference is made to the following detailed description of preferred embodiments and in connection with the accompanying drawings, in which.

DETAILED DESCRIPTION

The present disclosure pertains to time of flight (ToF) depth imaging. More specifically, this disclosure describes systems and techniques relating to continuous wave ToF imaging and eliminating the separate proximity detector in systems including ToF imaging. For example, systems and techniques are disclosed for eliminating the separate proximity detector placed on the front of smartphones.

A depth camera is a camera where each pixel outputs the distance between the camera and the scene. One technique to measure depth is to calculate the time it takes for the light to travel from a light source on the camera to a reflective surface and back to the camera. This travel time is commonly referred as time of flight. One goal of a time-of-flight camera is to estimate the delay between the emitted signal and the return signal.

Figure 1:
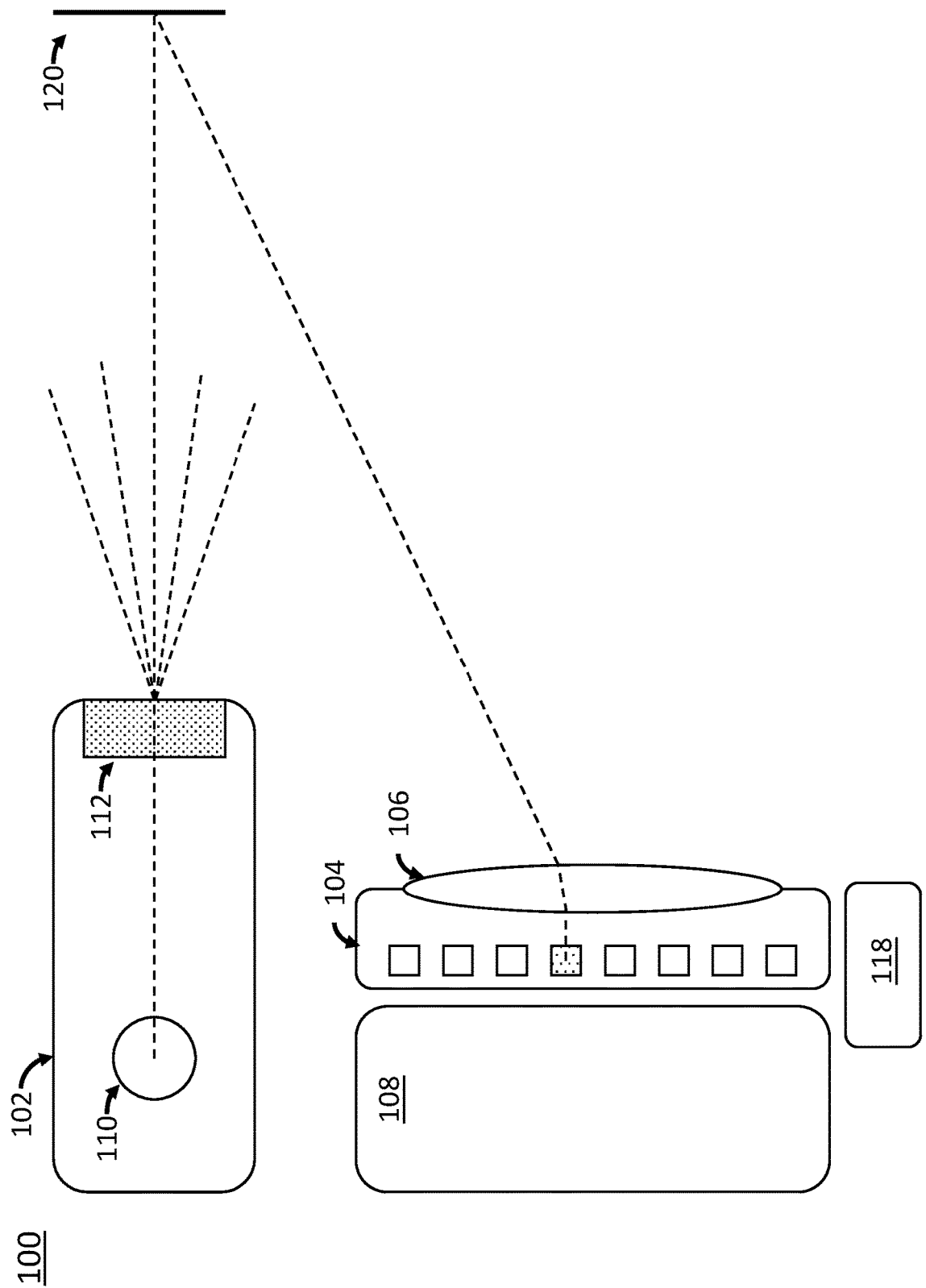
FIG. 1 shows an imaging device, according to some embodiments of the disclosure.

According to one implementation, as shown in FIG. 1, a ToF camera 100 includes a light source 102, a pixel array 104, a lens 106, a readout circuit 118, and a processing element 108. The light source 102 typically emits light in the near infrared domain (typically about 850 nm or about 940 nm wavelength). The light source 102 is usually a diffuse source that emits a beam of light with a certain divergence to illuminate the scene in front of the camera. In particular, the light source 102 can include a diffuser 112 for diffusing an emitted light from a light emitter 110. The light source 102 modulates the intensity of the light. The pixel array 104 of size H×W (sensor) collects the returning light from the scene 120, and outputs a value for each pixel. The lens 106 focuses the return light on the array 104. The processing element 108 processes the pixel values to output depth. In particular, the pixel values are voltages proportional to the amount of charge stored at each pixel. In some examples, a readout circuit 118 reads out the pixel values and converts the pixel values from analog to digital values.

Figure 2:
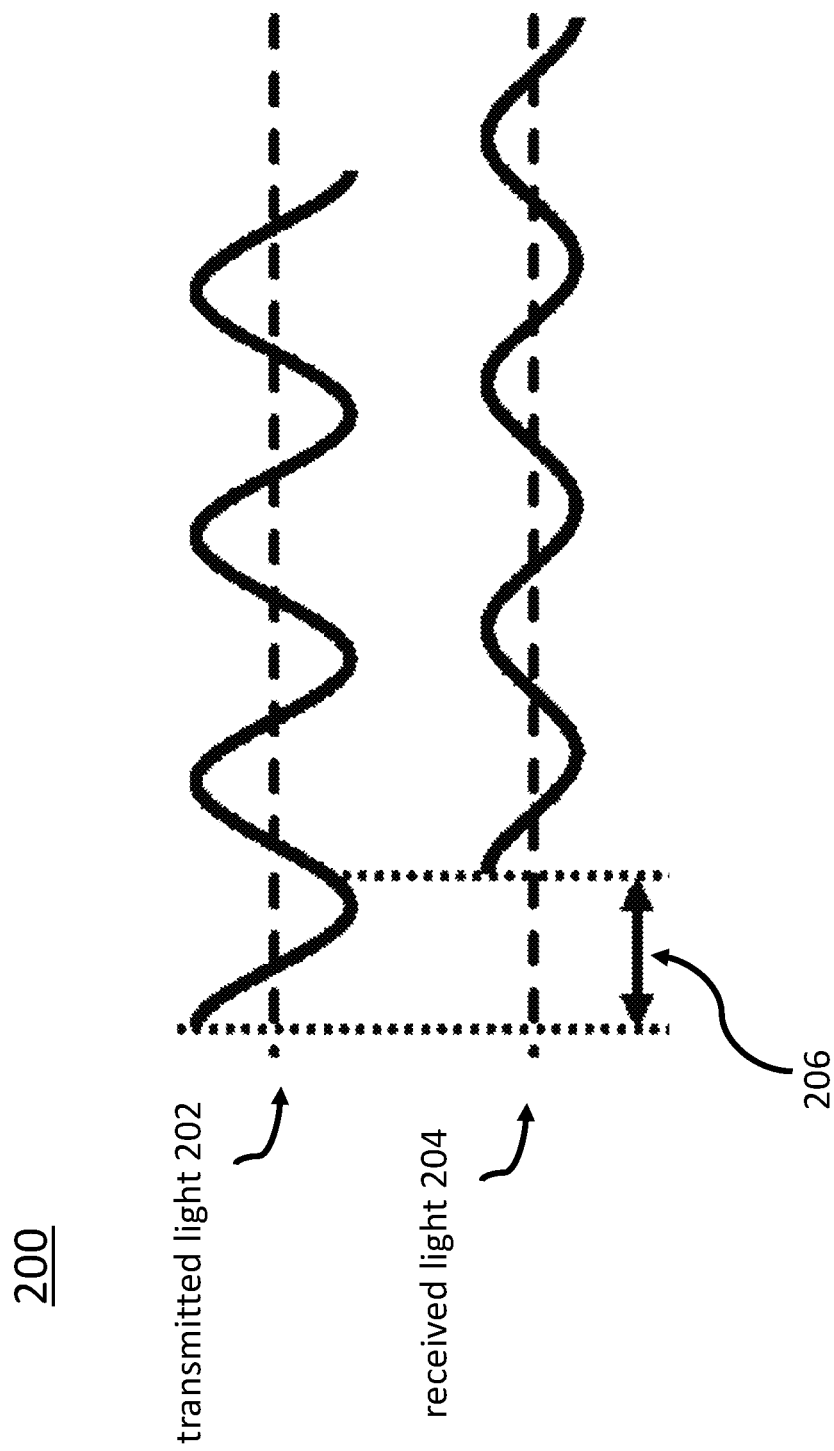
FIG. 2 shows transmitted and received waves, according to some embodiments of the disclosure.

Indirect time-of-flight measurements can be determined using continuous wave modulation. As shown in FIG. 2, there is a phase offset 206 between the transmitted light 202 from the light source 102, and the received light 204 at the pixel array.

According to various implementations, there are multiple approaches to modulating light. According to one mode, a simple approach is to use a continuous wave modulation, for example a sinusoidal modulation where the emitted signal is shown in equation (1):

$$s(t) = A_s \cos(2\pi f t) + B_s \quad (1)$$

where $A_s$ is the amplitude of the signal, $B_s$ is the offset of the signal, and $f$ is the modulation frequency, $$f = \frac{1}{T}$$

where T is the modulation period.

The received signal r(t) is a delayed and attenuated version of the emitted signal as shown in equation (2):

$$r(t) = \alpha s(t - \Delta) \quad (2)$$

Where $0 \leq \alpha < 1$ is an attenuation coefficient that depends on distance and surface reflectivity, and $\Delta$ is the delay of the return signal. The delay is proportional to the distance d such that $$\Delta = \frac{2d}{c}$$

(where c is the speed of light).

According to various implementations, the goal of a time-of-flight camera is to estimate the delay $\Delta$ between the emitted signal and the return signal.

According to one aspect, systems and methods are disclosed for combining the proximity detector is with the time-of-flight camera in a smartphone. In particular, systems and methods are provided for using the time-of-flight camera for proximity detection. In various examples, the time-of-flight camera includes a second, low resolution, mode that can be used for proximity detection.

Figure 3:
FIG. 3 shows an example of a smartphone, according to some embodiments of the disclosure.

FIG. 3 shows a typical smartphone 300, including a speaker 302, microphone 304, front-facing camera 306, and proximity sensor 308. Various smartphones also include additional sensors, including, for example, an ambient light sensor, an infrared camera, a flood illuminator, and a dot projector. The proximity sensor 308 is embedded in the smartphone 300, and placed in the front of the phone near the front-facing camera 306. The function of the proximity detector 308 is to disable the smartphone's touchscreen when a user is on a call with the phone at the user's ear, in order to avoid having the user's ear or cheek activate unwanted features on the screen. In various implementations, the proximity detector 308 is a simple time-of-flight camera with very few pixels, no lens, and a low power near-infrared emitter. In various examples, the proximity detector 308 has between about nine pixels and about sixteen pixels.

Front-facing depth sensing cameras in smartphones are increasingly popular but they come with the addition of the RGB camera ("selfie camera") and the proximity detector. Each of the cameras/detector requires one or multiple holes to be made in the body of the phone, either to let the emitter light out (for the depth sensing camera or the proximity detector), or to let incoming light in (for the RGB camera, the proximity detector and the depth sensing camera). Smartphone manufacturers typically try to reduce the number of holes in the phone's exterior to simplify manufacturing and to offer more screen space.

The proximity detector can also be used in other use-cases in smartphones. For example, the proximity detector can be used in the rear camera to help with focusing, or to detect that the phone's is face down on a table. In addition, the proximity detector can be used in other applications such as robots and cars for detecting the proximity of objects, for example for collision avoidance (without the need for a high resolution depth image).

Figure 4:
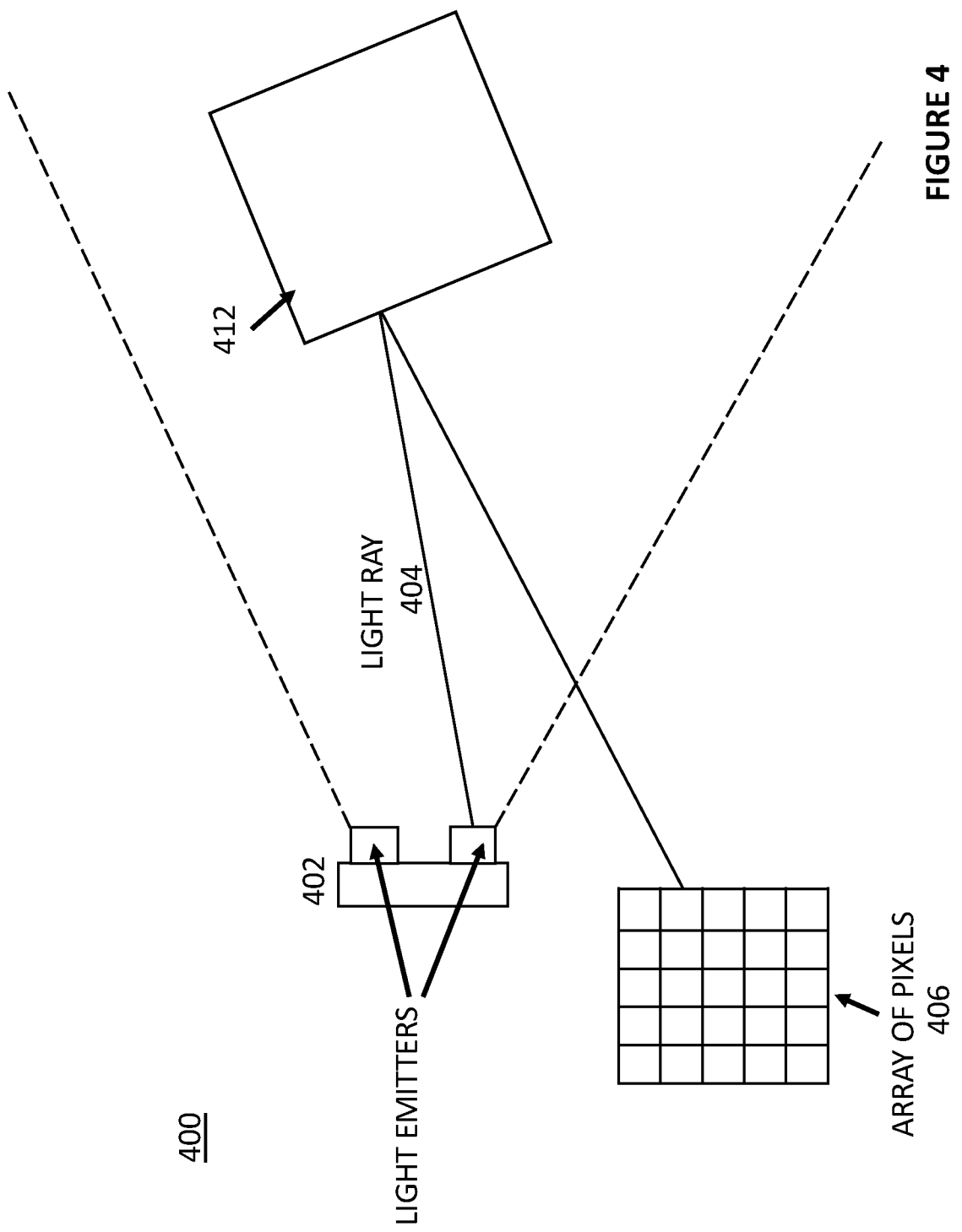
FIG. 4 shows an imaging system including a light emitter and an array of pixels, according to some embodiments of the disclosure.

FIG. 4 shows an imaging system 400 including a light emitter 402 and an array of pixels 406. In one implementation, the imaging system 400 is a proximity detector, and the light emitter 402 is a low power light emitter. In one example, the light emitter 402 is a low power near-infrared emitter. The light emitter 402 emits a light ray 404, which reflects off an object 412. The reflected light ray 404 is received at the array of pixels 406.

According to one aspect, systems and methods are provided for eliminating the separate proximity detector and combining the proximity detection function with the time-of-flight camera by operating the time-of-flight cameras in two modes: a low resolution mode and a high resolution mode. In the low resolution mode, used for proximity detection, the camera operates in a low resolution, low depth quality, low power, and close range mode. In some examples, in the low power mode, the system uses several micro-watts of power.

In the high resolution mode, used for front facing 3D imaging, the camera operates in a high resolution, high depth quality, high power and far range mode. The front facing 3D imaging mode is used, for example, for facial authentication, virtual green screen, simulated shallow depth of field, lighting effects, 3D scanning, among other functions.

Time-of-Flight Depth Measurements

In general, for time-of-flight depth measurements, the camera captures a depth image on a pixel array. The correlation sampling for time of flight depth determinations may be done at multiple sampling points in time or at multiple sampling pixels in the pixel array. Correlation function sampling is described below.

According to various implementations, in the low resolution mode, a proximity signal is triggered when one or more pixels in the array produces a phase estimate (or depth estimate) that is below a certain threshold. In the high-resolution mode the camera captures a high-quality, high-resolution depth image of size H×W.

Low Resolution Mode

In the low resolution mode of the time-of-flight camera, only a subset of pixels in the array are turned on and readout. One advantage of the low resolution mode includes reducing the energy spent in demodulation because most of the pixels in the array are not activated. Another advantage of the low resolution mode is reducing the energy spent in reading out the pixel data from the sensor array. In various examples, the subset of the pixels that are turned on remain constantly on, while the remaining pixels are deactivated until a time-of-flight depth image is requested.

In various examples, the subset of pixels in the array that are turned on (or activated) and readout in the low resolution mode includes one pixel, two pixels, three pixels, four pixels, about ten pixels, about twenty pixels, about fifty pixels, about two hundred pixels, or more than about two hundred pixels. In some examples, less than about 1% of the pixels in the pixel array are activated, about 1% of the pixels in the pixel array are activated, about 2% of the pixels in the pixel array are activated, about 5% of the pixels in the pixel array are activated, about 10% of the pixels in the pixel array are activated, or about 20% of the pixels in the pixel array are activated.

Figure 5A:
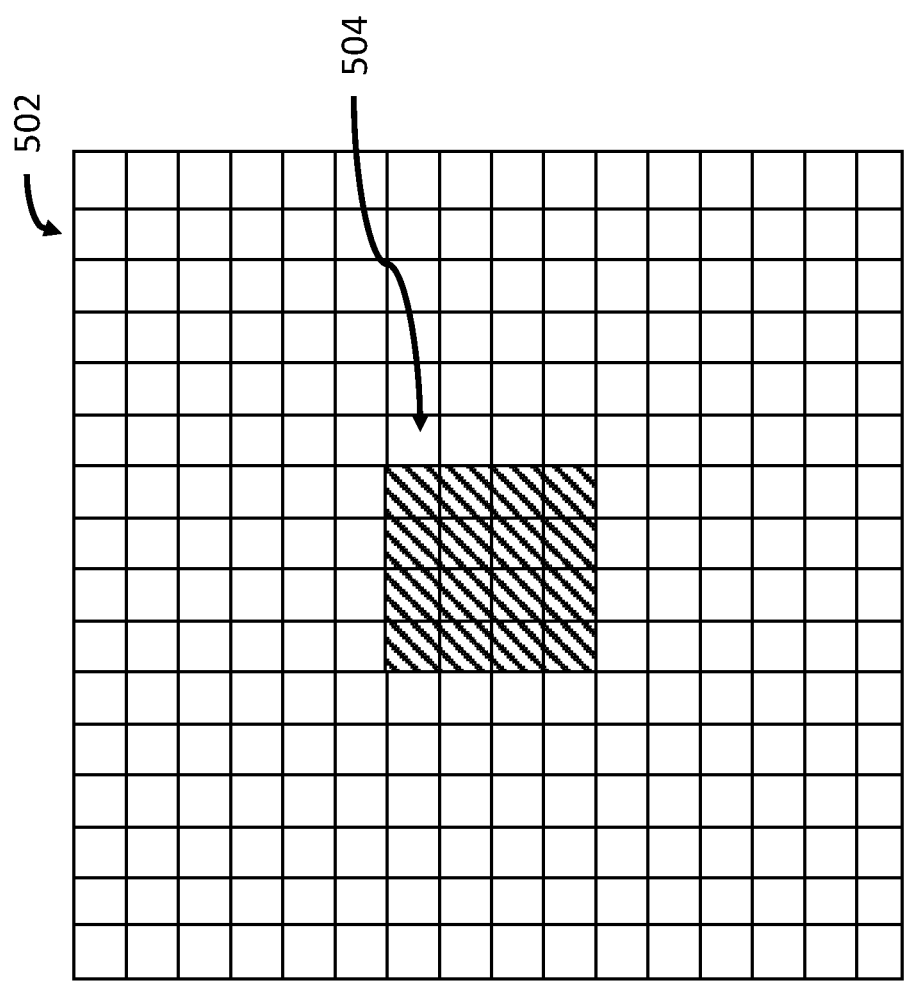
FIGS. 5A-5B show examples of pixel arrays with a subset of the pixels activated, according to some embodiments of the disclosure.
Figure 5B:
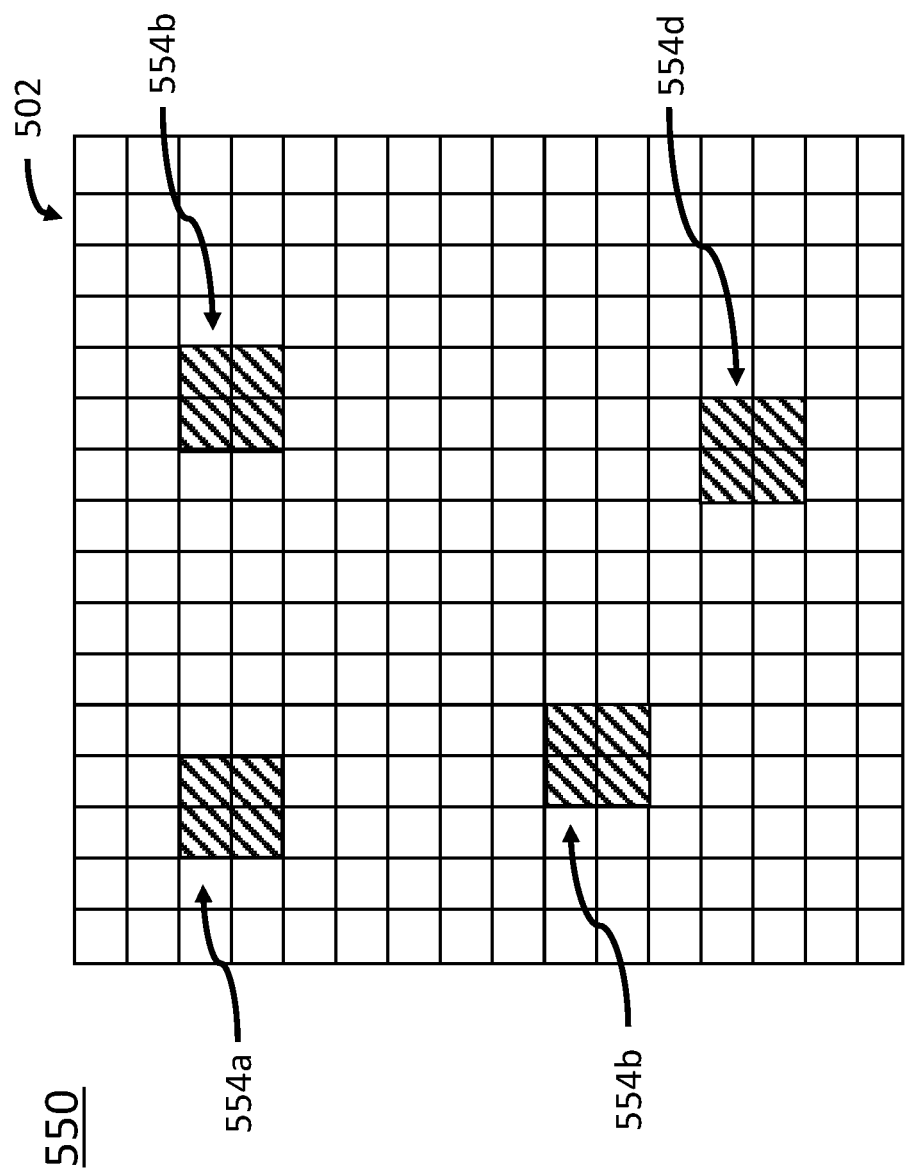

FIG. 5A shows an example 500 of a pixel array 502 in a low resolution mode with a small subset 504 of the pixels activated (shaded pixels are activated). FIG. 5B shows an example 550 of a pixel array 502 in a low resolution mode with several scattered small subsets of pixels activated. In particular, in the example 500 of FIG. 5B, first 554*a*, second 554*b*, third 554*c*, and fourth 554*d* subsets of pixels are activated (shaded pixels are activated).

According to various implementations, the low resolution mode includes a number of other features, in addition to reducing the number of active pixels. In some examples, in the low resolution mode, harmonic cancelation from the phase estimate is disabled. Disabling harmonic cancellation from the phase estimate reduces the number of correlation samples used for each pixel, where these samples come from different phases of modulated light so therefore also reduces the number of exposure/readout phases.

Regarding harmonic cancellation, in practice, the emitted signal s(t) and the demodulating signal g(t) are not pure sinewaves—the emitted signal and demodulating signal contain harmonics. The harmonics can stem from the non-linearity of the demodulation operation or light emission process, or from the fact the signals are generated from square waves.

When harmonics are present, the correlation function can contain terms at frequencies multiple of the modulation frequency. The harmonics in the correlation function cause errors in the phase offset estimates, which in turn lead to depth errors.

Phase estimates are typically determined using multiple correlation samples collected over a time interval. In some examples, in low resolution mode, different correlation samples are captured on different neighboring pixels in a pixel array at one selected time point, as described below with reference to FIG. 8. Capturing different correlation samples on different neighboring pixels, referred to herein as spatial correlation sampling, also reduces the number of exposure/readout phases.

In some implementations, the Illumination can be changed in phase when different sections of activated pixels are enabled but not yet read out. In one example, a first group of activated pixels is enabled during one phase modulation, the first group of activated pixels is then disabled while a second group of activated pixels is enabled for a second phase modulation of the Illumination, and then both the first and second groups of activated pixels are readout together.

In some implementations, the sections of pixels activated during Illumination are arranged in columns, while a subset of these activated pixels is readout in rows during the readout. Thus, N rows of M columns are the pixels used for the proximity detect function, with the minimal addressing function changes to allow the same array operation needed to activate all the pixels during illumination and readout.

In some implementations, in the low resolution mode, phase disambiguation is eliminated by using only one modulation frequency. Another way phase disambiguation is eliminated is by disambiguating the phase using other means such as the intensity of the return light.

In various implementations, the light source is a laser light source, and the laser driver is split into two segments. In some examples, in the low resolution mode, a segmented light source is used that can beam light with a small divergence for the proximity detection mode. In some examples, the segmented light source can also beam light with a large divergence for the high depth quality mode. Thus, the segmented light source operates according to whether the time of flight camera is operating in low resolution mode or high resolution mode.

According to various implementations, a typical light source for this kind of application is VCSELs (Vertical Cavity Surface Emitting Lasers). A VCSEL-based light source is comprised of an array of hundreds or thousands of individual VCSELs and produces a narrow beam of light. The beam goes into a diffuser to broaden the intended field of illumination. In some examples, in low-power proximity mode, some of the VCSELs in the array are turned off to adjust the beam divergence (field of illumination). In one example, in the proximity mode, only the center elements are activated.

In some examples, in the low resolution mode, the sub-array of pixels that are activated detect objects that are about one meter away from the pixel array, or less than about one meter away from the pixel array.

Using at least some of the changes in the operation of the time-of-flight camera discussed above, proximity detection can be performed in the low resolution mode using a single exposure/readout phase. A subset of the techniques discussed above can be implemented to trade off depth accuracy, resolution, and range for lower power consumption.

According to some implementations, the proximity detection algorithm is implemented on the sensor itself. When the proximity detection algorithm is implemented on the sensor itself, the latency in sending data to an external computing unit (e.g., an application processor) is reduced, and the decision time is accelerated. The proximity detection algorithm uses the information from one or multiple groups of pixels to determine whether to detect an "object in close proximity" event.

According to some implementations, the placement of the subset of pixels to be read out in the low-resolution mode depends on the field-of-view of the camera. In one example, the subset of pixels is a group of pixels in the center of the pixel array, as shown in FIG. 5A. In another example, the subset of pixels includes multiple groups of pixels scattered around the array (e.g., the pixels subsets 554*a*, 554*b*, 554*c*, 554*d*), as shown in FIG. 5B.

According to some implementations, a segmented light source is used for the dual mode time-of-flight camera. In one implementation, the segmented light source is a light source made of multiple sub-elements that are activated independently. In one example, the light source is segmented in a 3×3 element array. In the high quality mode, the nine sub-elements are activated whereas in the low resolution mode used for proximity detection, only the center element of the array is activated.

In various implementations, a time-of-flight distance is determined in the sub-system. In particular, the imager is integrated with the processor that determines distance. In various examples, the distance is determined using analog data. In other examples, the collected data is converted to digital before distance is determined.

High Resolution Mode

According to various implementations, in the high-resolution mode the camera captures a high-quality, high-resolution depth image of size H×W. The correlation sampling for time of flight depth determinations may be done at multiple sampling points in time or at multiple sampling pixels in the pixel array. Correlation function sampling is described below.

Continuous-wave time of flight sensors measure the distance at each pixel by sampling the correlation function between the received signal r(t) and a demodulating signal g(t) with the same frequency as s(t).

In some cases, the demodulating signal is also a sinewave:

$$g(t) = A_g \cos(2\pi f_{mod} t) + B_g \quad (3)$$

The operation performed by the pixel is a correlation operation:

$$c(\tau) = \int_0^{NT} r(t) g(t-\tau) dt \quad (4)$$

When both the emitted signal and the demodulating signal are sinewaves, the correlation value as a function of the delay τ applied to the demodulating signal is shown in equation (5):

$$c(\tau) = A \cos(2\pi f(\Delta - \tau)) + B \quad (5)$$

where $A = A_g A_s \alpha$ and $B = \alpha B_g B_s$.

The phase offset $\Phi = 2\pi f \Delta$ (proportional to depth) between the emitted signal and the demodulating signal can be estimated with the following formula:

$$\Phi = -\mathrm{atan}\left(\frac{c\left(\frac{T}{4}\right) - c\left(\frac{3T}{4}\right)}{c(0) - c\left(\frac{T}{2}\right)}\right) \quad (6)$$

Figure 6:
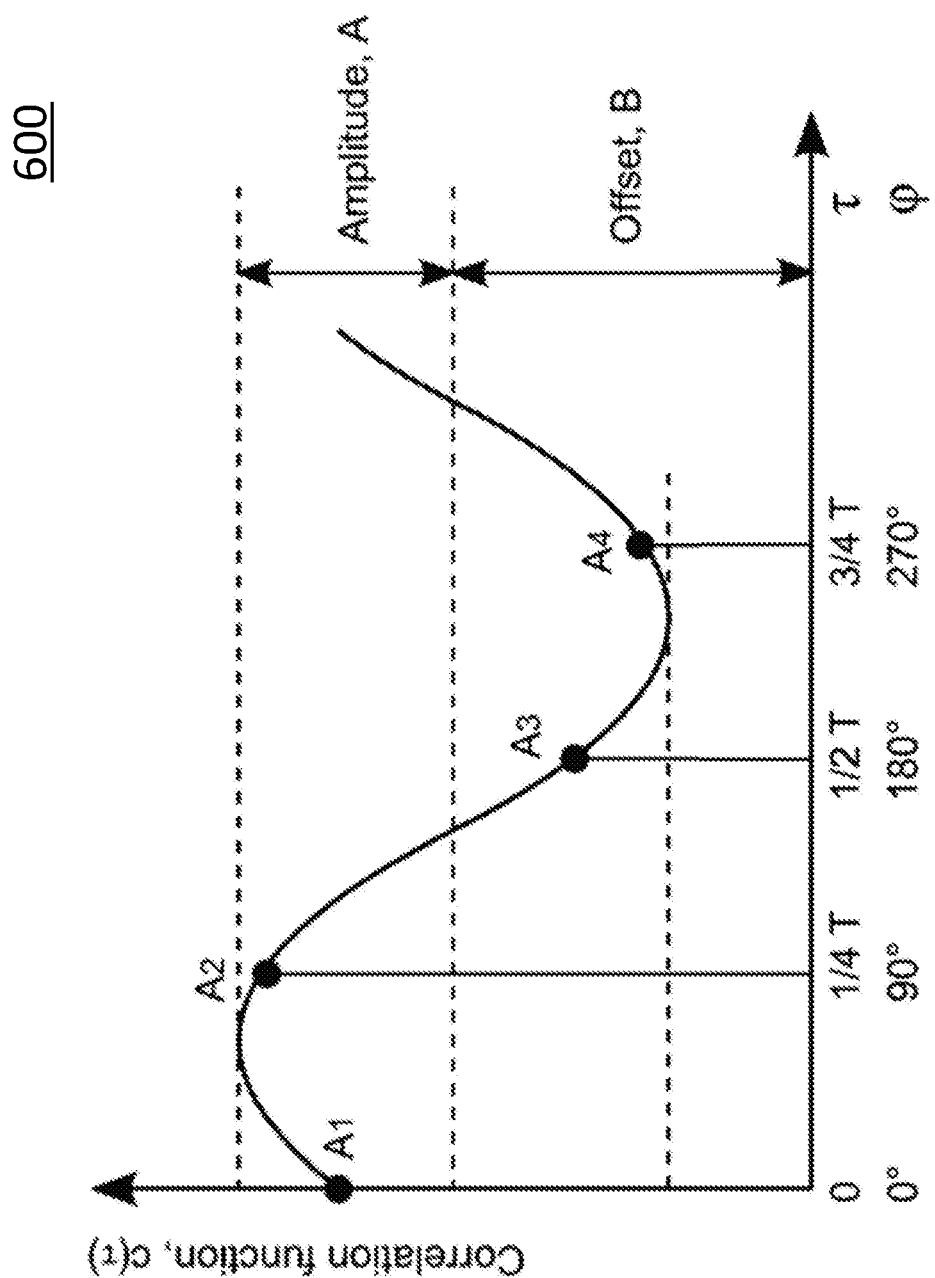
FIG. 6 shows an example of the correlation function sampling process, according to some embodiments of the disclosure.

FIG. 6 shows an example 600 of the correlation function sampling process, according to various embodiments of the disclosure.

An intensity estimate can be calculated using the following equation (7):

$$I = \sqrt{\left(c(0) - c\left(\frac{T}{2}\right)\right)^2 + \left(c\left(\frac{T}{4}\right) - c\left(\frac{3T}{4}\right)\right)^2} \quad (7)$$

In some examples, the correlation function is sampled in a single-ended operation. In some examples, the correlation function is sampled in a differential operation. In the single-ended operation, the pixel measures the correlation value c(τ) directly. In the differential operation, the pixel measures a differential correlation value:

$$c(\tau) - c\left(\tau - \frac{T}{2}\right).$$

Thus, four single-ended measurements are used to estimate the delay Δ. Two differential measurements are sufficient to estimate the delay Δ. A correlation sample is measured using two phases: an exposure phase and a readout phase. The exposure phase is the phase during which the laser emits light and the pixel demodulates the return light. The readout phase is the phase during which the pixel values are read out of the sensor chip.

Figure 7:
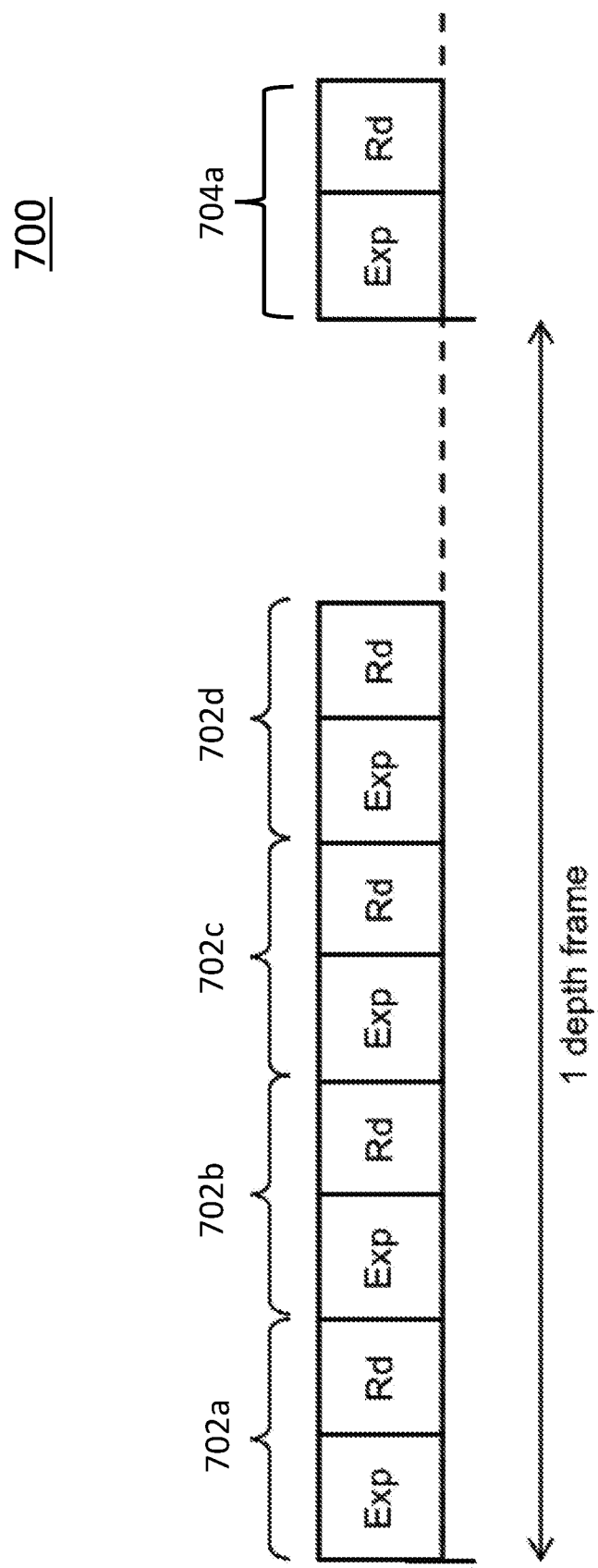
FIG. 7 shows a timing diagram of a sensor operation, according to some embodiments of the disclosure.

An example timing chart of the operation is shown in FIG. 7. In particular, FIG. 7 shows a timing diagram of a sensor operation. In various examples, there are multiple exposure and readout phases in a depth frame. As shown in FIG. 7, there are four consecutive exposure and readout phases 702a, 702b, 702c, 702d in a first depth frame, followed by more phases that are not shown. In various implementations, there is some idle time after the last exposure/readout phase of a depth frame before a new frame 704a starts.

According to various implementations, reducing the number of exposure/readout phases reduces energy consumption of the imager. In particular, emitting light and demodulating the return signal during the exposure phase consumes energy. As the distance to the target object (the object being imaged) increases, energy use increases, since more light is emitted to observe enough reflected return photons on the sensor. Additionally, reading the data out of the sensor consumes energy. Furthermore, elements in the scene can move during the capture of a depth frame. Similarly, the camera can move during the capture of a depth frame. Reducing the number of exposure/readout phases reduces the difference in the measured image between the measurements of two correlation samples.

Thus, in some implementations, it is more efficient to have a sensor that collects differential correlation measurements than a sensor that measures single-ended correlation measurements.

According to various implementations, the phase offset Φ is estimated modulo 2π due to the periodicity of the correlation function, which means that the time-of-flight Δ is estimated modulo T. This creates an ambiguity in the depth estimation. For example, at a modulation frequency of 200 MHz, an object at 10 cm will yield the same depth estimate as an object at 85 cm (depth uncertainty of 75 cm). One way to disambiguate the depth measurement is to repeat the phase offset estimation for different modulation frequencies. This ambiguity is typically removed by repeating the phase offset estimation with different modulation frequencies (typically 2 or 3 frequencies), which has the adverse effect of multiplying the number of exposure/readout phases.

Using the method discussed above, multiple correlation samples per pixel are used to compute the phase estimate, and the correlation samples (either single-ended or differential) are captured one after another (exposure, readout, exposure, readout, etc.). That technique uses multiple exposures and readouts to form a phase estimate (the number depends on the number of harmonics that are cancelled).

Figure 8:
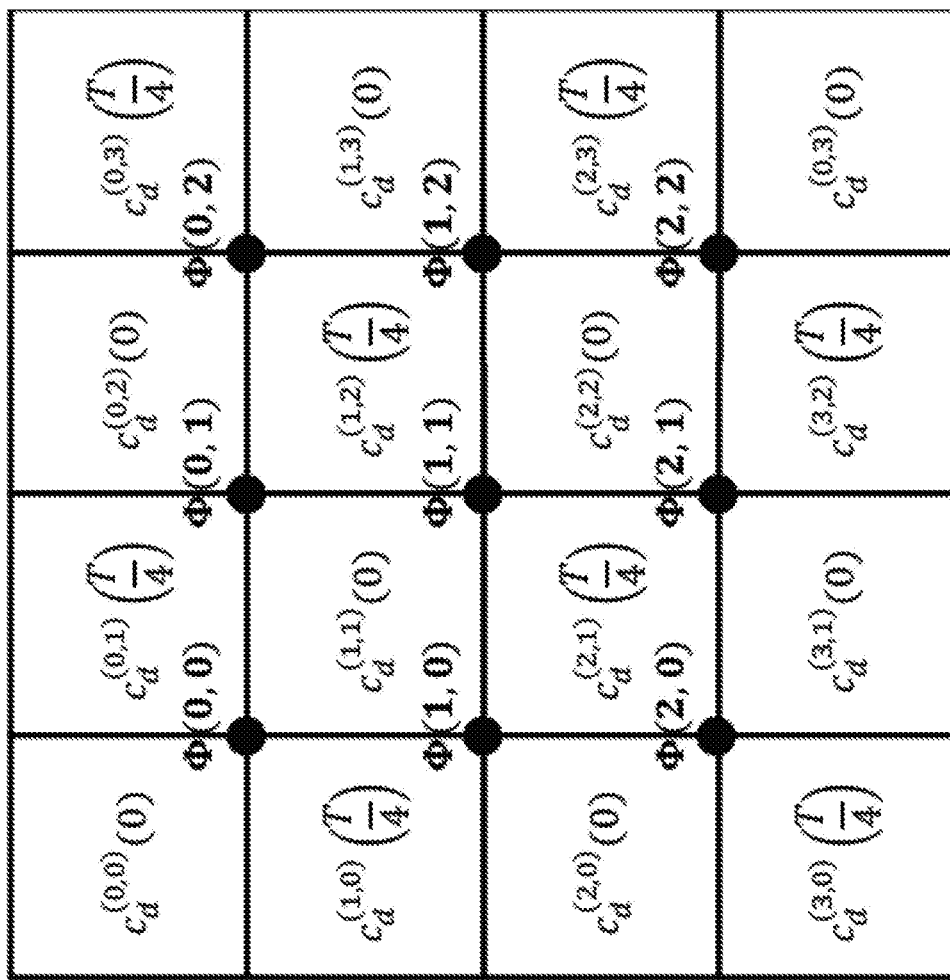
FIG. 8 shows a system for multiple differential correlation measurements in one frame, according to some embodiments of the disclosure.

FIG. 8 shows an arrangement 800 of multiple differential correlation measurements in one frame, according to various embodiments of the disclosure. In particular, FIG. 8 shows an example of two correlation samples per phase offset estimation. The correlation measurement system shown in FIG. 8 is designed to reduce the number of exposure/readout phases, to reduce the power consumption of the system, and to reduce motion artifacts stemming from the fact that a scene might change from one exposure to another.

As shown in FIG. 8, a sample of the correlation function on different pixels is collected instead of a sample of the correlation function at different times. For example, when the signal is a pure sinewave, and two differential correlation samples (four single-ended samples) per pixel are used, the sensor array can be decomposed into a set of 2×2 sub-arrays.

In the differential case, pixel (0,0) and pixel (1,1) of the sub-array can collect $$c_d(0) = c(0) - c\left(\frac{T}{2}\right),$$

while pixel (0,1) and pixel (1,0) can collect $$c_d\left(\frac{T}{4}\right) = c\left(\frac{T}{4}\right) - c\left(\frac{3T}{4}\right).$$

This arrangement is shown in FIG. 8. In the single-ended case, we can have the following mapping: pixel(0,0)=c(0), $$\text{pixel}(0, 1) = c\left(\frac{T}{4}\right), \text{pixel}(1, 0) = c\left(\frac{3T}{4}\right) \text{ and pixel}(1, 1) = c\left(\frac{T}{2}\right).$$

The phase offset at each pixel is calculated from its four neighboring pixels in a way similar to what's described in the previous section. The calculation is different depending on whether the pixel indexes add up to an even number or add to an odd number. For example:

$$\Phi(0, 0) = \operatorname{atan}\left(\frac{c_d^{(0,0)}(0) + c_d^{(1,1)}(0)}{c_d^{(1,0)}\left(\frac{T}{4}\right) + c_d^{(0,1)}\left(\frac{T}{4}\right)}\right) \quad (8)$$

and $$\Phi(0, 1) = \operatorname{atan}\left(\frac{c_d^{(1,1)}(0) + c_d^{(0,2)}(0)}{c_d^{(0,1)}\left(\frac{T}{4}\right) + c_d^{(1,2)}\left(\frac{T}{4}\right)}\right) \quad (9)$$

The technique described herein effectively decreases the spatial resolution of the array because the phase offset is estimated from multiple neighboring pixels.

Sensor Mode of Operation

Figure 9:
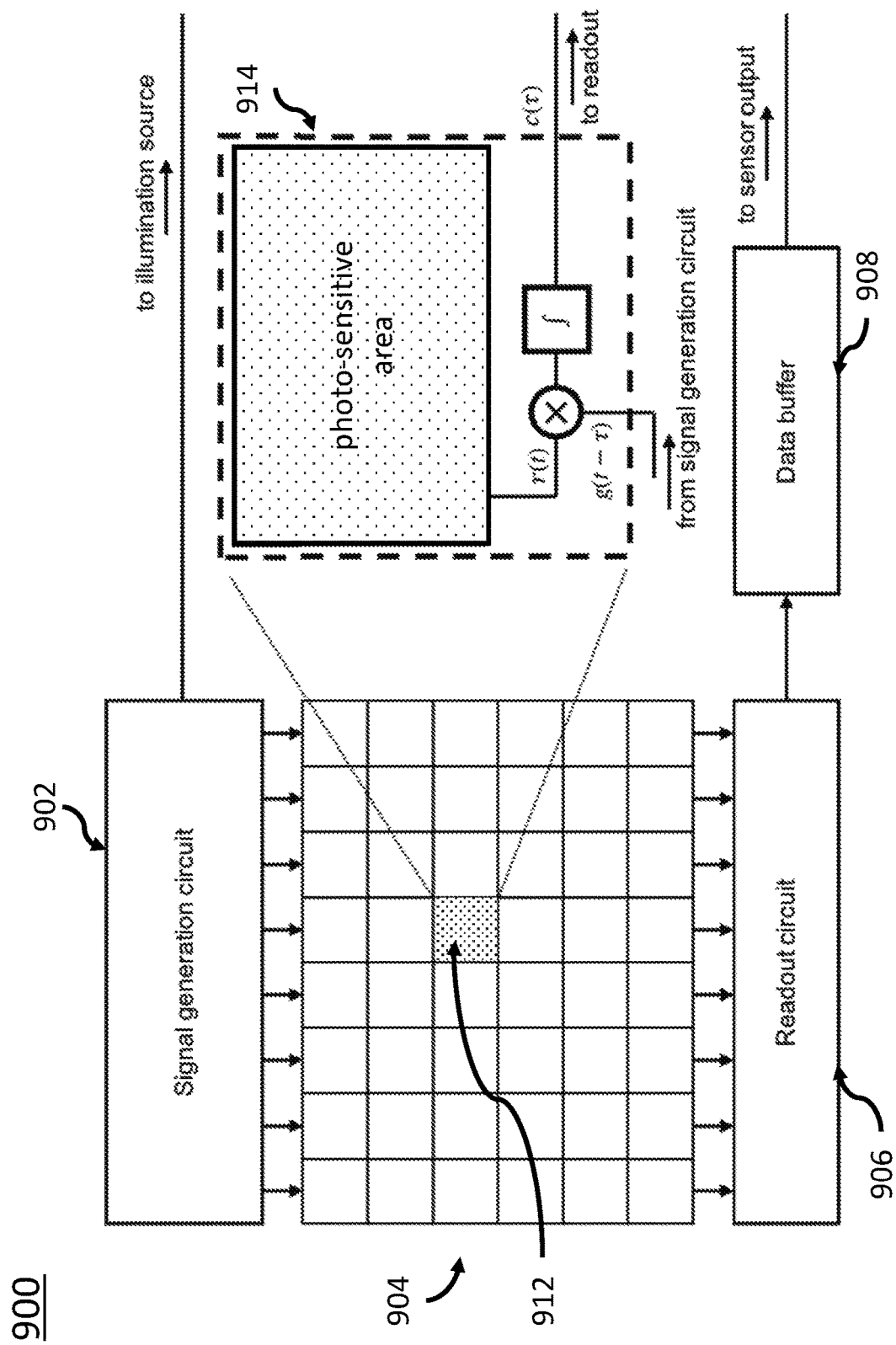
FIG. 9 is an example model of a continuous-wave time-of-flight sensor, according to some embodiments of the disclosure.

FIG. 9 is an example model of a continuous-wave time-of-flight sensor 900, according to various embodiments of the disclosure. In particular, FIG. 9 shows a possible continuous-wave demodulating sensor architecture including a signal generation circuit 902, a sensor array 904, a readout circuit 906, a data buffer 908, and an output 910. The sensor array includes multiple elements such as element 912. Each element 912 includes a photo sensitive area 914 an input from the signal generation unit 916. Each element of the sensor array 904 produces a correlation sample and outputs the correlation sample to the readout circuit 906.

The signal generation circuit 902 outputs a signal to an illumination source, and also transmits the signal generation information to the elements of the sensor array 904. Referring to element 912 as an example of the elements of the sensor array 904, the element 912 uses signals received at the photo-sensitive area 914 and the input data from the signal generation circuit 902 to measure a phase offset and determine a correlation sample. The correlation sample is output to the readout circuit 906. The readout circuit 906 outputs data to the data buffer 908, which outputs the sensor output.

Figure 10:
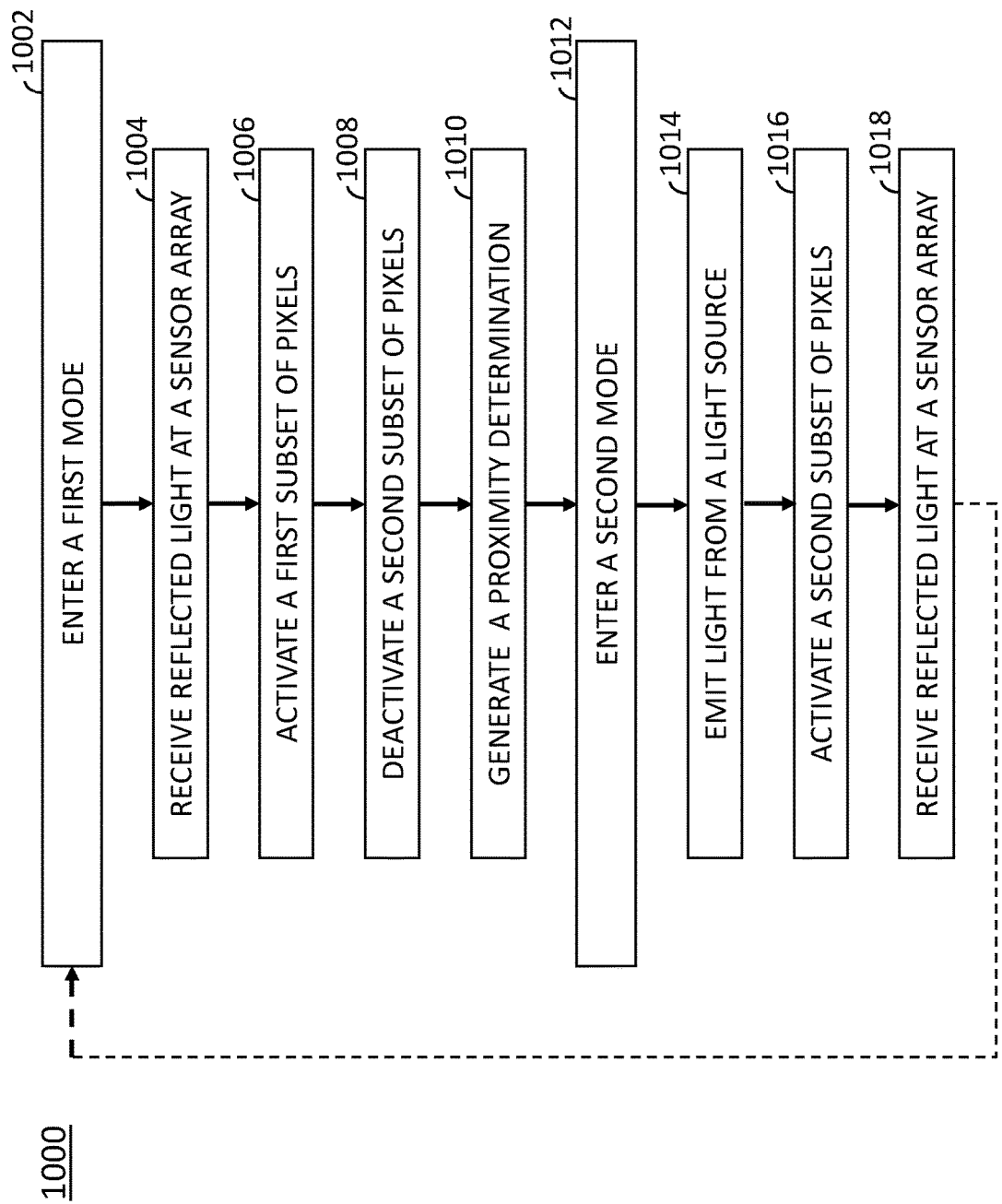
FIG. 10 shows a method for proximity detection using a time-of-flight depth imaging system, according to some embodiments of the disclosure.

FIG. 10 shows a method 1000 for proximity detection using a time-of-flight depth imaging system, according to various embodiments of the disclosure. At step 1002, the imaging system enters a first mode of operation. The first mode is the proximity detection mode. In the first mode, at step 1004, reflected light is received at a sensor array. The sensor array includes a plurality of pixels. At step 1006, a first subset of the plurality of pixels is activated. At step 1008, a second subset of the plurality of pixels is deactivated (if it was previously activated). If the second subset of the plurality of pixels was not already activated, then no action is taken at step 1008. At step 1010, a proximity determination is generated. The proximity determination is based, at least in part, on the first subset of the plurality of pixels. In particular, based on signals received at the first subset of pixels, the proximity determination is generated. In some examples, the proximity determination is generated based on distance estimates from the first subset of pixels.

At step 1012, the imaging system enters a second mode of operation. The second mode of operation is the depth imaging mode. In the second mode, at step 1014, light is emitted from a light source during a first time interval. At step 1016, the second subset of pixels is activated. At step 1018, reflected light is received at the sensor array, including reflected emitted light from the light source. According to various examples, a depth image is generated based on signals received at the plurality of pixels, including signals received at the first subset and signals received at the second subset.

Exposure Phase

During the exposure, the light emitter emits intensity-modulated light towards the scene, and the pixels in the array 904 demodulate the returned light in order to measure the phase offset at each pixel. The pixels in the array 904 are driven by a common demodulation signal $g(t-\tau)$ that is phase synchronized with the signal $s(t)$ that modulates the emitter.

In practice, there is a phase offset between the signal that modulates the emitter and the demodulation signal that causes an offset in the phase offset estimate. The phase offset error can be calibrated out at manufacturing.

In some pixel architectures, such as photo-mixing device (PMD) pixels, the demodulation is performed in the analog domain with a special pixel structure. In other pixel architectures, such as Single-Photon Avalanche Detector (SPAD)-based pixels, the demodulation operation is performed in the digital domain.

The generation of the demodulation signals and the light emission are two major sources of energy consumption. The generation of the demodulation signals tends to consume an amount of energy that is proportional to the area of the sensor array 904. The power consumption of the emitter depends on its optical power and the driver efficiency. The optical power depends on the time-of-flight camera range specification.

Readout Phase

The readout phase follows the exposure phase. During the readout phase, the emitter is turned off and the pixels are not demodulating the return light. The pixels values (sampled correlation function for each pixel) are read out (typically one row at a time) by the readout circuit 906. If the demodulation operation is performed in the analog domain, the correlation samples for each pixel are converted to a digital value. Conversion to digital value is typically done by multiple analog-to-digital converters (ADCs) that can be shared by multiple pixels in the array 904. In one example, there is one ADC per row of the sensor array 904. The data from the readout circuit 906 is buffered in the data buffer 908 and streamed out of the time-of-flight sensor 900.

Possible Implementations

The proposed technique can be implemented in a sensor such as the sensor 900 described in FIG. 9 by having the signal generation circuit 902 generate different demodulation signals $g(t-\tau)$ for different pixels in the array 904. The routing of the signal to each pixel can either be fixed to reduce circuit complexity, or programmable to allow for different phase configurations.

Select Examples

Example 1 provides a method for proximity detection using a time-of-flight depth imaging system including entering a first imaging system mode and, in the first imaging system mode: receiving reflected light at a sensor array having a plurality of pixels, activating a first subset of the plurality of pixels, deactivating a second subset of the plurality of pixels, and generating a proximity determination based on data from the first subset of the plurality of pixels; and entering a second imaging system mode and, in the second imaging system mode: emitting light from a light source during a first time interval, activating the second subset of the plurality of pixels, and receiving reflected emitted light at the sensor array.

Example 2 provides a method according to example 1, further comprising, in the second imaging system mode, generating a high resolution depth image.

Example 3 provides a method according to examples 1-2, where the first mode is a low resolution mode.

Example 4 provides a method according to one or more of the preceding examples, where activating the first subset of the plurality of pixels includes collecting reflected light at the first subset of the plurality of pixels.

Example 5 provides a method according to one or more of the preceding examples, further including comparing the reflected light collected at the first subset of the plurality of pixels to emitted light, and determining a distance to an object.

Example 6 provides a method according to one or more of the preceding examples, where generating the proximity determination includes generating the proximity determination based, at least in part, on the distance.

Example 7 provides a method according to one or more of the preceding examples, further including collecting a plurality of spatial correlation samples from the first subset of the plurality of pixels, and determining a phase based on at least a subset of the plurality of spatial correlation samples.

Example 8 provides a time of flight image processing system having two modes, including a light source configured to emit light during a first time interval, a sensor array comprising a plurality of pixels for receiving reflected light, wherein, in a first mode, a first subset of the plurality of pixels are activated and a second subset of the plurality of pixels are deactivated, and a processor configured to receive a readout from the sensor array, wherein, in the first mode, the processor generates a proximity determination.

Example 9 provides a system according to one or more of the preceding examples, where the first mode is a low resolution mode.

Example 10 provides a system according to one or more of the preceding examples, where the first subset of the plurality of pixels includes less than about a quarter of the plurality of pixels.

Example 11 provides a system according to one or more of the preceding examples, where the first subset of the plurality of pixels includes adjacent pixels.

Example 12 provides a system according to one or more of the preceding examples, where the first subset of the plurality of pixels includes non-adjacent pixels.

Example 13 provides a system according to one or more of the preceding examples, where in a second mode, the plurality of pixels including the second subset of the plurality of pixels are activated, and the processor generates a high resolution depth image.

Example 14 provides a system according to one or more of the preceding examples, where during the first time interval, the time of flight image processing system is in the second mode.

Example 15 provides a system according to one or more of the preceding examples, where when the first subset of pixels is activated, the first subset of pixels is configured to collect reflected light.

Example 16 provides a system according to one or more of the preceding examples, where the processor is configured to compare the collected reflected light to the emitted light to determine a distance to an object, and wherein the processor generates the proximity determination based, at least in part, on the distance.

Example 17 provides a system for proximity detection using a time-of-flight depth imager, including a light source configured to emit light, a sensor array comprising a plurality of pixels for receiving reflected light, including a first subset of pixels and a second subset of pixels, and a processor configured to receive a readout from the sensor array. In a first imaging system mode, the first subset of pixels is activated, the second subset of pixels is deactivated, and the processor makes a proximity detection determination. In a second imaging system mode, the first and second subsets of pixels are activated, the light sources emits light, and the processor generates a high resolution depth image.

Example 18 provides a system according to one or more of the preceding examples, where the first imaging mode is a low resolution mode.

Example 19 provides a system according to one or more of the preceding examples, where when the first subset of pixels is activated, the first subset of pixels is configured to collect reflected light.

Example 20 provides a system according to one or more of the preceding examples, where the processor is configured to compare the collected reflected light to the emitted light to determine a distance to an object, and wherein the processor generates the proximity determination based, at least in part, on the distance.

Variations and Implementations

Applicant has recognized and appreciated that distance sensing may be performed by an imaging device with a higher power efficiency by emitting illumination light in only some, not all, cases in which a distance determination is desired. In those cases, in which illumination light is not emitted by the device, image analysis techniques may be used to estimate distances by comparing 2D images captured by the imaging device and detecting how an object or objects in those images change over time.

According to some embodiments, distances previously determined when illumination light was produced and captured may be used as a reference to aid in estimation of distance using 2D image analysis techniques. For example, illumination light may be emitted periodically to periodically determine distances, and in between those emissions image analysis may be performed to determine distances (e.g., using the previously-determined distances obtained using illumination light as a reference point).

According to some embodiments, a decision of whether to emit illumination light (to determine distances by collecting the reflected illumination light) may be based on an analysis of 2D images. The analysis may determine how accurate an estimation of distance will be based on one or more 2D images, so that when the accuracy falls below an acceptable threshold, a decision may be made to obtain a more accurate determination of distance using illumination light. In this manner, illumination light may be emitted only when a 2D image analysis does not produce acceptably accurate distance measurements, which may reduce the frequency with which the illumination light is emitted, thereby reducing power usage.

While aspects of the present disclosure may be used in any suitable imaging device, there may be particular advantages to applying such aspects within imaging devices that capture light during a plurality of frames, such as in video capture. Some imaging devices may be configured to ultimately preserve a single image yet may capture images a number of times prior to and/or after the image device has been activated to preserve the single image (e.g., devices configured to display a scene prior to capture of a single image for purposes of previewing the still image, and/or devices configured to capture a plurality of images when activated to capture a single image so that a single image can be selected and/or synthesized from the plurality of images). For the purposes of the discussion herein, a "frame" is considered to be applicable to both image capture during: (i) video capture; and (ii) still image capture where multiple images are registered in a device during the still image capture process (including, but not limited to, those examples above).

According to some embodiments, determining whether to emit illumination light based on an analysis of a 2D image may be performed in the same frame during which the 2D image was captured. Making the determination within the same frame may ensure that, in the case it is determined that illumination light is not to be emitted, a 2D image may be captured during the subsequent frame without there being an interim frame in which the determination is be made. Accordingly, the imaging device may operate efficiently by capturing an image during each frame. According to some embodiments, once it is determined that illumination light is to be emitted, the illumination light is emitted during the same frame during which the determination was made. Alternatively, if there is insufficient time during a frame to capture a 2D image, determine whether to emit illumination light and also emit the illumination light (e.g., because the imaging device does not have the processing capacity to perform all these steps within the frame because the frame time is very short and/or due to processing limitations of the device), the emission of illumination light may occur in a subsequent frame.

According to some embodiments, determination of a distance using illumination light, such as laser light from a laser diode, may use a pulse modulation technique. In pulse modulation, illumination light is emitted as a pulse of known duration so that the reflected light pulse can be identified and its time of flight measured (and therefore the distance to an object determined). In some implementations, a pulse modulation technique may operate an image sensor with a plurality of shutters that each capture a segment of the reflected illumination light pulse. The fraction of reflected illumination light that is measured during each shutter may imply the time of flight of the light pulse.

According to some embodiments, determination of a distance using illumination light may use a continuous wave technique. In such a technique, a distance to an object is determined by measuring a phase shift of light reflected from an object. The phase shift is indicative of a distance to the object when a wavelength of the illumination light is known.

Following below are more detailed descriptions of various concepts related to, and embodiments of, techniques of distance sensing. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Figure 11:
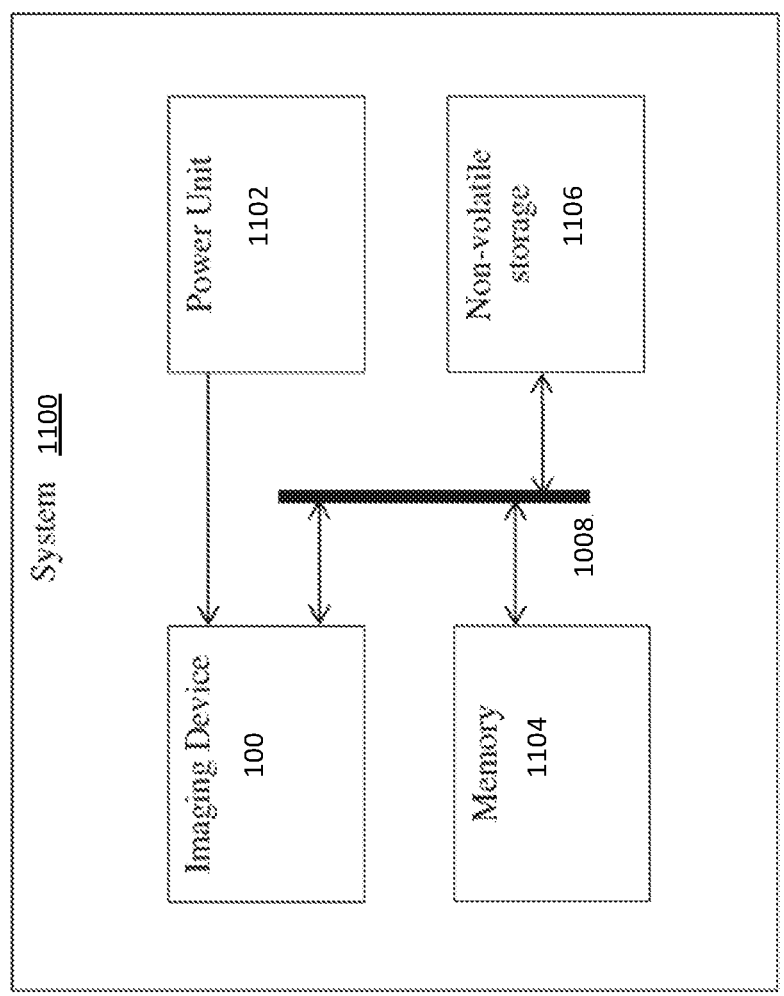
FIG. 11 illustrates an example of system incorporating an imaging device of the type described herein.

FIG. 11 illustrates an example of system incorporating an imaging device of the type described herein. An illustrative implementation of a system 1100 which may incorporate an imaging device of the types described herein and shown in FIG. 1. The system 1100 includes the imaging device 100 of FIG. 1, although imaging devices according to alternative embodiments described herein may alternatively be included. A power unit 1102 may be provided to power the imaging device 100, along with potentially power other components of the system. The power unit 1102 may be a battery in some embodiments, such as a battery typically used in mobile phones, tablets, and other consumer electronics products. As has been described, in some embodiments the imaging device 100 may provide low power operation, and thus may facilitate the use of a low power battery as the power unit 1102. However, the power unit 1102 is not limited to being a battery, nor is it limited to a particular type of battery in all embodiments.

The system 1100 further comprises a memory 1104 and a non-volatile storage 1106. Those components may be communicatively coupled to the imaging device 100 in any suitable manner, such as via a shared communication link 1108. The shared communication link 1108 may be a bus or other suitable connection. The memory 1104 and/or non-volatile storage 1106 may store processor-executable instructions for controlling operation of the imaging device 100, and/or data captured by the imaging device 100. In connection with techniques for distance sensing as described herein, code used to, for example, signal an illumination light source to produce one or more light pulses, to open and/or close a shutter of an image sensor, read out pixels of an image sensor, perform distance calculations based on collected illumination light, etc. may be stored on one or more of memory 1104 or non-volatile storage 1106. Processing unit 108 may execute any such code to provide any techniques for distance sensing as described herein. Memory 1104 may store data representative of 2D and/or 3D images captured by imaging device 100. The memory 1104 and/or non-volatile storage 1106 may be non-transitory memory in at least some embodiments.

Figure 12:
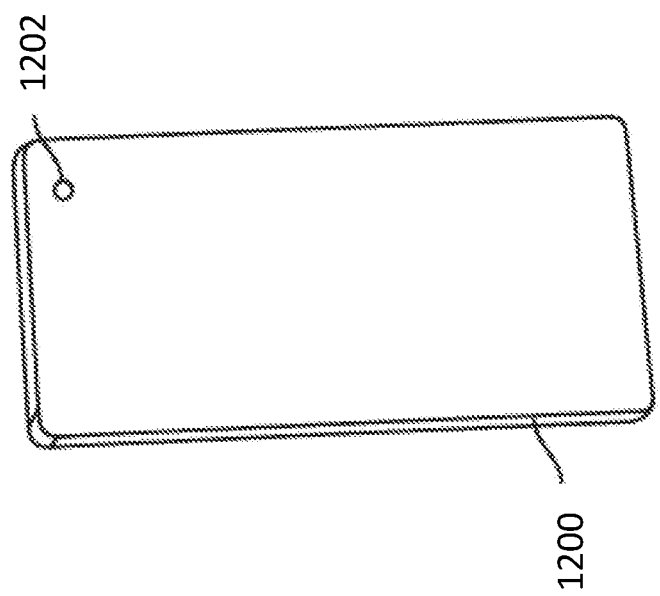
FIG. 12 illustrates a mobile device incorporating an imaging device of the types described herein.

The imaging systems described herein may be used in various applications, some examples of which are described in connection with FIGS. 12-14. A first example is that of a mobile device, such as a smartphone, tablet computer, smartwatch, or other mobile device. The imaging systems of the type described herein, such as the imaging device 100 or system 1100, may be used as a camera component of the mobile device. FIG. 12 illustrates a mobile device 1200 incorporating an imaging device of the types described herein.

The mobile phone 1200 includes a camera 1202 which may be an imaging device of the types described herein for capturing and generating 3D images, such as imaging device 100. The use of imaging device 100 as camera 1202 may be facilitated by low power consumption operation, such as the manners of operation described herein in connection with the imaging devices according to aspects of the present application. Mobile devices, such as mobile phone 1200, typically operate from battery power, and thus components which consume substantial power can be impractical for use within such devices. Imaging devices of the types described herein, by contrast, may be deployed within such devices in a power efficient manner.

Figure 13:
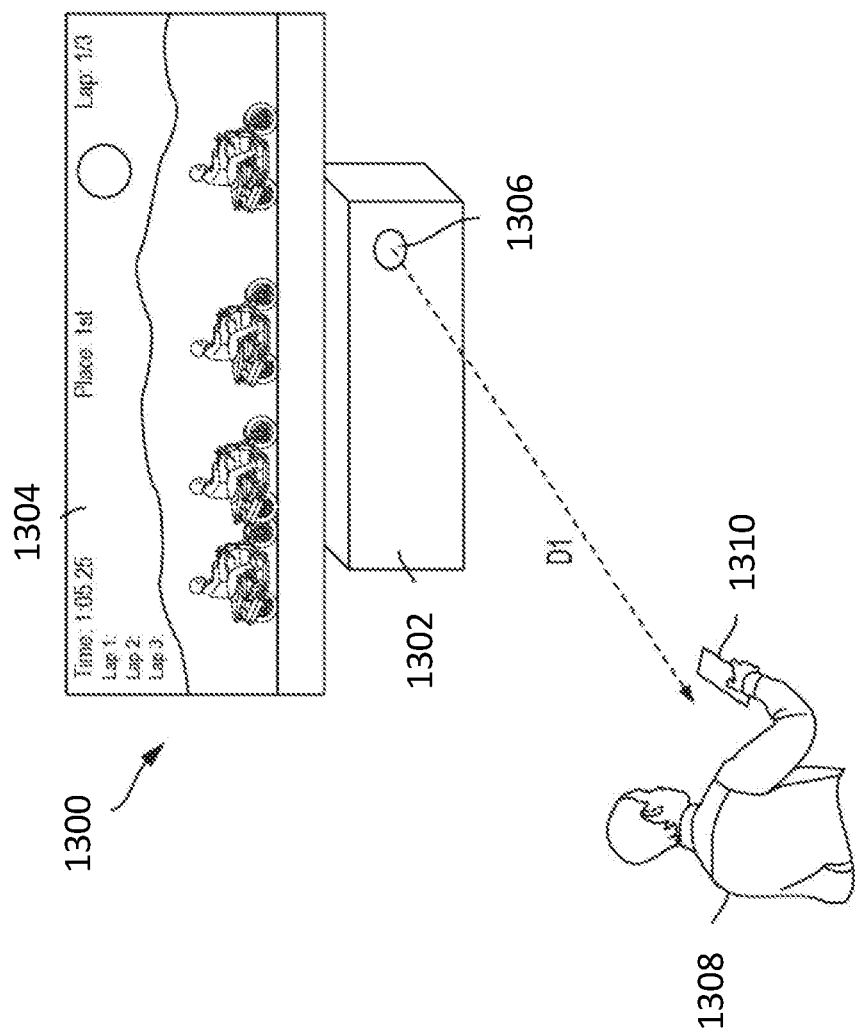
FIG. 13 illustrates a gaming console incorporating an imaging device of the types described herein.

FIG. 13 illustrates an entertainment system 1300 implementing an imaging system of the types described herein. The entertainment system 1300 includes a console 1302 and display 1304. The console may be a video gaming console configured to generate images of a video game on the display 1304, and may include a camera 1306. The camera 1306 may be an imaging system of the types described herein configured to capture 3D images, such as imaging device 100. In the example of FIG. 13, a user 1308 may interact with the entertainment system via a controller 1310, for example to play a video game. The camera 1306 may capture images of the user and/or controller, and may determine a distance D1 to the user. The distance information may be used to generate a 3D image for display on the display 1304 or for control of some other aspect of the entertainment system. For example, the user 1302 may control the entertainment system with hand gestures, and the gestures may be determined at least in part through capturing distance information D1.

Imaging systems of the types described herein may also be employed in robotics. FIG. 14 illustrates an example of a robot 1402 with an imaging system 1404. The robot may be mobile and the information collected by imaging system 1404 may be used to assist in navigation and/or motor control of the robot. The imaging system 1404 may be of the types described herein, for example being the system or imaging device 100. Mobile robots are typically powered by batteries, and thus imaging systems of the types described herein which may operate at relatively low power according to at least some of the described embodiments may facilitate their integration with the robot.

Figure 14:
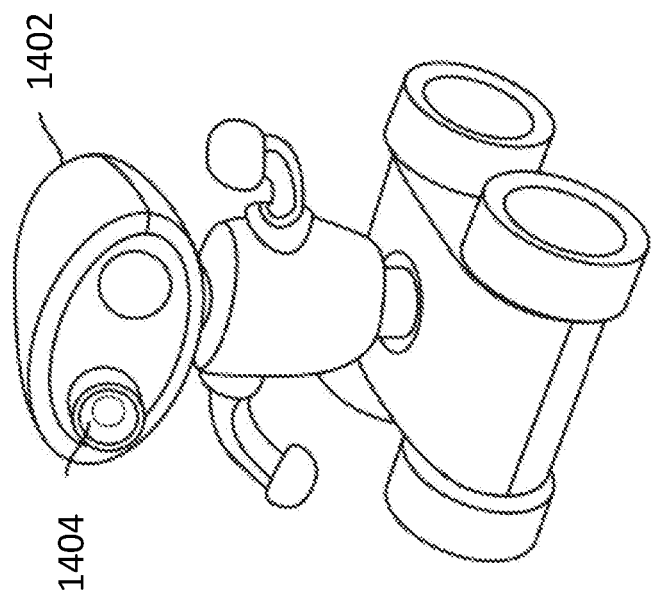
FIG. 14 illustrates a robot incorporating an imaging device of the types described herein.

Examples of uses of the technology described herein beyond those shown in FIGS. 12-14 are also possible. For example, automobiles and security cameras may implement 3D imaging devices of the types described herein.

The phrase "and/or," as used herein in the specification and in the claims, should be understood to mean "either or both" of the elements so conjoined, i.e., elements that are conjunctively present in some cases and disjunctively present in other cases. The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In embodiments, the imaging device can take measurements from a scene using the imaging sensor. The term "measurements" can include capturing two-dimensional images and depth images (e.g., depth information that can be used to construct a depth map). The term "two dimensional images" includes any images that are not depth images, such as color (RGB) images, greyscale images, infrared images, other conventional images, etc.

Various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) or a computer readable storage device (which may include the foregoing examples) encoded with one or more programs that, when executed on one or more computers or other processors, implement some of the various embodiments of the present application.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be open-ended, i.e., to mean including but not limited to. The transitional phrases "consisting of" and "consisting essentially of" shall be closed or semi-closed transitional phrases, respectively.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods. In this respect, various inventive concepts may be embodied as a computer readable storage medium or multiple computer readable storage media (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Elements other than those specifically identified by the "and/or" clause may optionally be present, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "between" is to be inclusive unless indicated otherwise. For example, "between A and B" includes A and B unless indicated otherwise.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. A method for proximity detection using a time-of-flight depth imaging system, comprising:
    entering a first imaging system mode and, in the first imaging system mode:
        receiving reflected light at a sensor array having a plurality of pixels,
        activating a first subset of the plurality of pixels, wherein activating the first subset includes collecting reflected light from the first subset of the plurality of pixels,
        deactivating a second subset of the plurality of pixels,
        generating a proximity determination based on the collected reflected light from the first subset of the plurality of pixels, and
        triggering a proximity signal based on the proximity determination crossing a threshold; and
    entering a second imaging system mode and, in the second imaging system mode:
        emitting light from a light source during a first time interval,
        activating the second subset of the plurality of pixels, and
        receiving reflected emitted light at the sensor array.

2. The method of claim 1, further comprising, in the second imaging system mode, generating a high resolution depth image.

3. The method of claim 1, wherein the first mode is a low resolution mode.

4. The method of claim 1, further comprising comparing the reflected light collected at the first subset of the plurality of pixels to emitted light, and determining a distance to an object.

5. The method of claim 4, wherein generating the proximity determination includes generating the proximity determination based on the distance.

6. The method of claim 1, further comprising collecting a plurality of spatial correlation samples from the first subset of the plurality of pixels, and determining a phase based on at least a subset of the plurality of spatial correlation samples.

7. The method of claim 1, wherein triggering a proximity signal further comprises triggering a proximity signal when the imaging system is close to an object.

8. A time of flight image processing system having two modes, comprising:
    a light source configured to emit light;
    a sensor array comprising a plurality of pixels for receiving reflected light, wherein,
        in a first mode, a first subset of the plurality of pixels are activated and a second subset of the plurality of pixels are deactivated, wherein when the first subset of pixels is activated, the first subset of pixels is configured to collect reflected light, and
        in a second mode, the plurality of pixels including the second subset of the plurality of pixels are activated; and
    a processor configured to receive a readout from the sensor array, wherein, in the first mode, the processor generates a proximity determination based on the collected reflected light from the first subset of the plurality of pixels and triggers a proximity signal based on the proximity determination crossing a threshold.

9. The system of claim 8, wherein the first mode is a low resolution mode.

10. The system of claim 8, wherein the first subset of the plurality of pixels includes less than about a quarter of the plurality of pixels.

11. The system of claim 8, wherein the first subset of the plurality of pixels includes adjacent pixels.

12. The system of claim 8, wherein the first subset of the plurality of pixels includes non-adjacent pixels.

13. The system of claim 8, wherein, in the second mode, the processor generates a high resolution depth image.

14. The system of claim 13, wherein, the light source is configured to emit light during a first time interval, and, during the first time interval, the time of flight image processing system is in the second mode.

15. The system of claim 8, wherein the processor is configured to compare the collected reflected light to emitted light to determine a distance to an object, and wherein the processor generates the proximity determination based on the distance.

16. The system of claim 8, wherein the light source is a segmented light source configured, in the first mode, to emit light having a small divergence.

17. A system for proximity detection using a time-of-flight depth imager, comprising:
    a light source configured to emit light;
    a sensor array comprising a plurality of pixels for receiving reflected light, including a first subset of pixels and a second subset of pixels; and
    a processor configured to receive a readout from the sensor array;
    wherein, in a first imaging system mode, the first subset of pixels is activated and reflected light is collected at the first subset of pixels, the second subset of pixels is deactivated, the processor makes a proximity detection determination based on the collected reflected light at the first subset of pixels, and the processor triggers a proximity signal based on the proximity determination crossing a threshold; and wherein, in a second imaging system mode, the first and second subsets of pixels are activated, the light source emits light, and the processor generates a high resolution depth image.

18. The system of claim 17, wherein the first imaging mode is a low resolution mode.

19. The system of claim 17, wherein the processor is configured to compare the collected reflected light to the emitted light to determine a distance to an object, and wherein the processor generates the proximity determination based-on the distance.

20. The system of claim 17, wherein the light source is a segmented light source configured to emit light having one of a small divergence and a large divergence.

* * * * *